(12) United States Patent
Kundner et al.

(10) Patent No.: US 8,753,033 B2
(45) Date of Patent: Jun. 17, 2014

(54) MEDICAL ACCESSORY UNIT SECURING DEVICE

(75) Inventors: Thomas Kundner, Buckenhof (DE); Stephan Zink, Erlangen (DE)

(73) Assignee: Siemens Aktiengesellschaft, München (DE)

( * ) Notice: Subject to any disclaimer, the term of this patent is extended or adjusted under 35 U.S.C. 154(b) by 204 days.

(21) Appl. No.: 13/033,415

(22) Filed: Feb. 23, 2011

(65) Prior Publication Data

US 2011/0243646 A1 Oct. 6, 2011

(30) Foreign Application Priority Data

Feb. 26, 2010 (DE) .......................... 10 2010 002 393

(51) Int. Cl.
*A61G 13/10* (2006.01)

(52) U.S. Cl.
USPC ................ 403/254; 403/348; 5/621; 410/104

(58) Field of Classification Search
USPC ............... 5/601, 621–624; 411/349; 410/104; 248/222.52, 223.41, 225.11; 403/252, 403/254, 259, 348
See application file for complete search history.

(56) References Cited

U.S. PATENT DOCUMENTS

| 2,373,722 | A | * | 4/1945 | Von Opel | ...................... 411/349 |
| 3,530,515 | A | | 9/1970 | Jacoby | |
| 3,845,527 | A | * | 11/1974 | Lombardi | ..................... 24/575.1 |
| 4,068,878 | A | * | 1/1978 | Wilner | ....................... 294/82.17 |
| 4,901,964 | A | | 2/1990 | McConnell | |
| 5,368,427 | A | * | 11/1994 | Pfaffinger | ..................... 411/553 |
| 7,661,215 | B2 | * | 2/2010 | Okamoto | ........................ 40/620 |
| 7,980,798 | B1 | * | 7/2011 | Kuehn et al. | .................. 410/104 |
| 2003/0095846 | A1 | * | 5/2003 | Breckel | ......................... 410/104 |
| 2004/0223806 | A1 | | 11/2004 | Seufert | |
| 2008/0213061 | A1 | * | 9/2008 | Womack et al. | .............. 410/104 |

FOREIGN PATENT DOCUMENTS

| DE | 33 44 497 A1 | 7/1985 |
| DE | 103 13 899 A1 | 10/2004 |

OTHER PUBLICATIONS

German Office Action dated Apr. 1, 2011 for corresponding German Patent Application No. DE 10 2010 002 393.0-35 with English translation.

* cited by examiner

*Primary Examiner* — Joshua Kennedy
(74) *Attorney, Agent, or Firm* — Lempia Summerfield Katz LLC (57) ABSTRACT

A securing device for securing medical accessory units to a table for a medical imaging apparatus, includes a frame unit, a locking unit that is configured for locking to the table, and an adjusting unit for setting at least one locking position. The adjusting unit has at least one guide unit for a guided locking motion into the at least one locking position.

17 Claims, 8 Drawing Sheets

MEDICAL ACCESSORY UNIT SECURING DEVICE

This application claims the benefit of DE 10 2010 002 393.0, filed Feb. 26, 2010.

BACKGROUND

The present embodiments relate to a securing device for securing medical accessory units to a table for a medical imaging apparatus.

Before magnetic resonance imaging examinations, for the sake of safety of the patient and to minimize patient movements during the magnetic resonance imaging examination, a patient is secured to a table. For the magnetic resonance imaging examination, additional medical devices that are fixed to the table, such as local coils, are also provided. Securing the patient and/or fixing the additional medical devices is done by way of belts that are secured laterally to the table.

For that purpose, a securing device, using which a belt is secured to the table, is known. The securing device is introduced in an introduction position into a T-shaped groove of the table and locked by way of a 90° rotation of a connection element for connecting the belt. This securing device has the disadvantage that a plurality of positions are available for introduction into the T-shaped groove, but in only one of the possible introduction positions may the securing device be locked to the table. This may lead to unwanted twisting of the belt and/or unlocking. The securing device is unlocked from the non-lockable position, reintroduced with the table in the introduction position intended for locking, and locked. This also leads to a major loss of time in preparing a specimen for the magnetic resonance imaging examination.

SUMMARY AND DESCRIPTION

The present embodiments may furnish a securing device that is fast and simple to operate, while preventing mistakes in securing to a table.

The present embodiments are based on a securing device for securing medical accessory units, for example, to a table for a medical imaging apparatus. The securing device includes a frame unit, a locking unit that is designed for locking to the table, and an adjusting unit for setting at least one locking position.

The adjusting unit has at least one guide unit for a guided locking motion into the at least one locking position. Using the guide unit, forces that lead to a motion of the adjusting unit in a predetermined direction may be transmitted to the adjusting unit. In one embodiment, the guide unit is formed by a curved and/or wavy guide unit, so that forces of motion may be transmitted as a function of a position of the adjusting unit along the curved and/or wavy guide unit. The term "locking" may be the securing and/or fixation in at least one direction of components and/or structural units that are movable relative to a further component and/or structural unit in at least one direction, to the further component and/or the further structural unit. The locking motion of the adjusting unit may be transmitted to the locking unit, and the locking motion may advantageously be formed by a rotary motion. The term "locking position" may be a position that is fixed and/or secured with regard to at least one direction. In one embodiment, the frame unit includes at least one belt retention element, on which a belt may be fixed for securing the medical accessory devices and/or the patient. The term "medical imaging apparatus" may be an MRI system for MRI measurement. In one embodiment, the medical accessory unit is formed by further units and/or components that reinforce and/or simplify a measurement using the medical imaging apparatus, such as local coils for an MRI scanner. The securing device (e.g., a medical belt securing device) is configured, for example, as compatible with MRI and is formed of a non-magnetizable material, such as a plastic. As a result of the present embodiments, fast and simple use of the securing device upon securing to the table may advantageously be achieved. One-handed use may be provided based on the guided locking motion. For example, using the guide unit, a locking motion of the adjusting unit and of the locking unit may be predetermined. As a result, unwanted misuse or incorrect use during a locking event may advantageously be avoided.

In one embodiment, the frame unit has at least one spring element, which reinforces a locking motion into the at least one locking position. The term "spring element" may be an elastically deformable element and/or component. Stable locking in the locking position may be achieved because unlocking, for example, may require a motion on the part of the adjusting unit counter to a spring force of the spring element. It is advantageous that mounting the securing device wrong, for example, on the table, may be prevented. A force that, because of the locking, acts on the locking element and thus on the adjusting unit in the direction of a release motion out of the locking position, may at least partly be absorbed by the spring element.

An advantageous reinforcement of a motion into the locking position may be achieved if the securing device has at least one rib-like guide element. In one embodiment, the rib-like guide element is guided inside the guide unit. The spring element has the rib-like guide element, so that a motion reinforced by the spring element may be transmitted directly to the guide element. Effective force transmission from the adjusting unit to the spring element and/or from the spring element to the adjusting unit may be achieved using the rib-like guide element. The guide element may have an embodiment that is an alternative to the rib-like embodiment.

The securing device (e.g., the spring element) may also have at least two rib-like guide elements that are disposed essentially symmetrically relative to a rotary axis. Advantageous force transmission may be achieved because of the at least two ribs, and thus wear of the ribs may at least be reduced. The rotary axis may be formed by a rotary axis of the adjusting unit for the locking motion into the locking position.

In one embodiment, the guide unit has at least one guide path with at least one guide portion. The guide portion includes at least one local minimum along the at least one guide path. In this connection, the term "guide portion" may be a portion of the guide unit and, for example, a portion of the guide path. The term "minimum along the guide path" may be a partial region and/or portion of the guide path, in which a minimal force acts on the guide element guided in the guide path, and/or the guide element, the partial region and/or portion assumes a stable position inside the guide path that the guide element cannot leave without an exertion of force from outside. For example, the guide element may leave the guide portion only when the guide element is lifted out of this minimum because of an exertion of force. Advantageously, next to the minimum in at least one direction, a maximum is disposed along the guide path, so that moving a guide element out of the minimum is made more difficult, yet a motion into the minimum is reinforced by the guide path. For example, if a force that is below a minimum threshold about the minimum acts on the guide element, the guide element is lifted, but because of an embodiment of the guide path, the guide element is guided back into the guide portion having the minimum. As a result of this embodiment, a stable positioning of the adjusting unit in at least one locking position may be achieved.

In one embodiment, a guide element guided in the guide portion brings about a locking position of the locking unit, as a result of which, safe, secure and durable locking may be achieved. Unwanted undoing of the locking (e.g., from movement on the part of the patient) is prevented. Forces that, in the locking position, act on the locking unit and/or the adjusting unit may be compensated for by the guide path, in that the guide element, because of the embodiment of the guide path, is guided back into the guide portion having the minimum.

In another embodiment, the guide unit has at least two guide portions, each guide portion with one local minimum along the guide path, for at least two different locking positions. In one embodiment, the two different locking positions differ in terms of at least one degree of freedom of motion of the securing device relative to the table. Advantageously, in a first locking position of the securing device, an orientation of the securing device (e.g., with the belt on the table) may be achieved before the securing device is locked in the second locking position to the table in three directions in space.

In one embodiment, the locking unit is provided in at least one locking position for a motion along at least one first direction in space and for a locking along at least one second direction in space. In the at least one locking position, the securing device may, for example, be guided in captive fashion inside a locking element of the table, and thus an orientation of securing belts together with the securing unit may be attained.

In another embodiment, the adjusting unit has at least one adjusting element that is formed by a lever element (e.g., a rotary lever), as a result of which, an advantageous transmission of force from a user to the adjusting unit may be achieved upon actuation of the adjusting element.

An advantageous flow of force from a user to the adjusting unit may be achieved if the adjusting unit has at least two adjusting elements that are disposed symmetrically with respect to a rotary axis. The adjusting unit may be actuated by a user, regardless of an introduced position of the securing device into a locking element corresponding to the locking unit of the table.

The frame unit has at least one recess, and at least one adjusting element of the adjusting unit, in a locking position, is disposed substantially entirely inside the at least one recess. An unwanted protrusion of the adjusting element past the frame unit, and an associated threat to the patient, may advantageously be avoided. A collision of the adjusting element with some further component may be prevented, and unintentional opening of the securing device, for example because an adjusting element has become caught, is prevented.

In one embodiment, the frame unit has at least one stop element. As a result, a further transmission of force from an adjusting unit to the locking unit in a stopped position may be avoided. The stop element may be provided for stopping a locking motion of the adjusting unit. Advantageously, at least one stopped position is formed by a locking position. As a result, wear from over-rotation of the adjusting unit in the locking position that could lead to damage to a guide element and/or the adjusting unit, for example, may be reduced. If the adjusting unit has at least two adjusting elements, it may be advantageous if the frame unit has one stop element for each of the at least two adjusting elements.

In one embodiment, the securing device has at least one force transmission element that is designed for transmitting force from the adjusting unit to the locking unit. A force and/or a motion of the adjusting unit and, example, of an adjusting element of the adjusting unit may be transmitted in at least one direction (e.g., a direction of rotation about a rotary axis) to the locking unit and, for example, to a locking element. The adjusting unit (e.g., the adjusting element) may be uncoupled from the locking unit with regard to force transmission in at least one further direction. In one embodiment, the force transmission element is formed by a force transmission bolt. Alternatively, the adjusting unit and the locking unit may be configured in one piece with one another.

In another embodiment, the frame unit has an introduction unit for introduction into a locking element corresponding to the locking unit of the table, and the locking unit is disposed at least partly in a region of the introduction unit. The locking element of the table may be formed by a groove (e.g., a T-shaped groove), into which the securing device may be introduced using the introduction unit. As a result of this embodiment, the locking movement may be at least partly protected against damage, and a compact securing device may be attained. In addition, using the introduction unit, lateral tilting of the securing device inside the T-shaped groove of the table may be prevented, and thus simple positioning of the securing device for the user may be attained. Advantageously for this purpose, the introduction unit has at least one recess, and the locking unit is disposed at least partly inside the recess.

Advantageously, the locking unit has at least one clamping element, as a result of which in a structurally simple way, locking in an arbitrary position along a locking element of the table corresponding to the locking unit (e.g., along the T-shaped groove) may be attained. Alternatively or in addition, the locking unit may have further locking elements that, for example, have an alternative design to the clamping element (e.g., a screw element, detent element, and/or other locking elements that appear appropriate to one skilled in the art).

In one embodiment, the clamping element has a length that is oriented substantially perpendicular to a length of an adjusting element of the adjusting unit. A space-saving disposition of the adjusting element in at least one locking position may be attained.

BRIEF DESCRIPTION OF THE DRAWINGS

Further advantages will become apparent from the ensuing description of the drawings. In the drawings, exemplary embodiments are shown. The drawings, specification and claims include numerous characteristics in combination. One skilled in the art will expediently consider these characteristics individually as well and put the characteristics together to make useful further combinations.

DETAILED DESCRIPTION OF THE DRAWINGS

Figure 9:
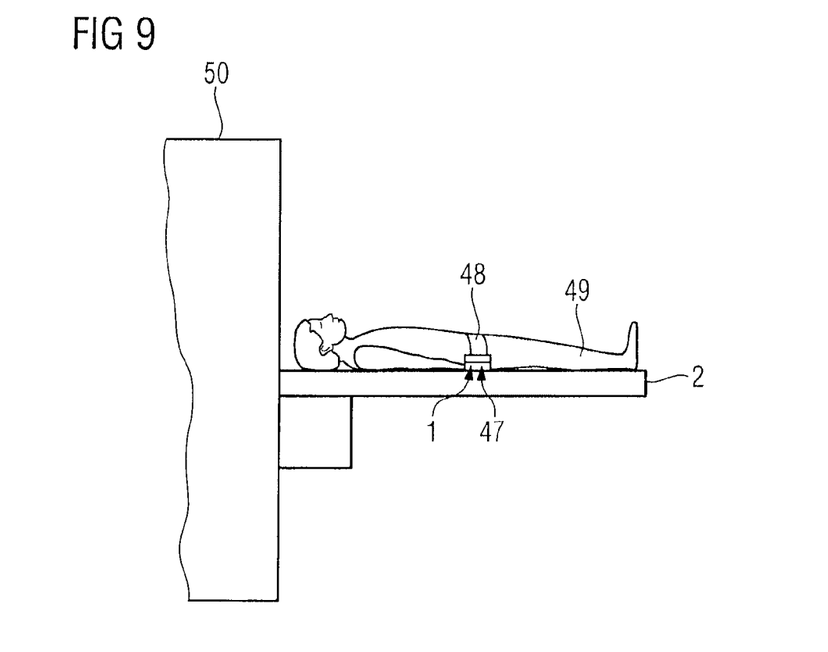
FIG. 9 shows an MRI scanner with a table and one embodiment of the securing device.
Figure 10:
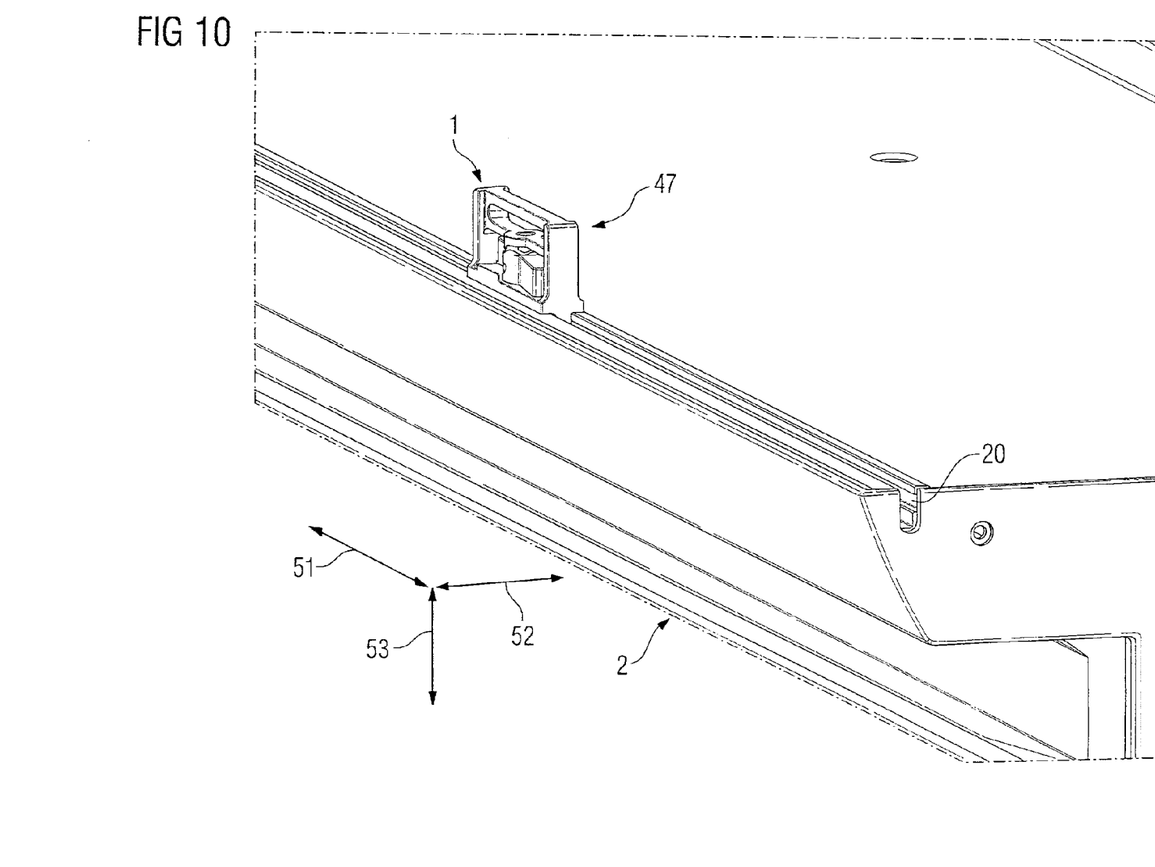
FIG. 10 shows a detail of the table and one embodiment of the securing device.

In FIGS. 1 to 6, a securing device 1 according to the present embodiments is shown in various securing positions. The securing device 1 includes a medical belt securing device 47 for securing belts 48. Using the belts 48, a patient 49, for example, and/or medical accessory units (e.g., local coils) are fixed on a table 2 of a medical imaging apparatus (see FIGS. 9 and 10). The medical imaging apparatus is formed by an MRI scanner 50. In one embodiment, the securing device 1 is MRI-compatible for this purpose and is formed of a non-magnetizable material, such as a plastic.

The securing device 1 includes a frame unit 3, an adjusting unit 4, and a locking unit 5 (see FIGS. 1 to 8). The frame unit 3 has an essentially rectangular shape in a front view. The frame unit 3 has a belt retention unit 6 and an introduction unit 7. The belt retention unit 6 and the introduction unit 7 are disposed on opposed end regions of the frame unit 3, transversely to a length 8 of the frame unit 3. The belt retention unit 6 may be used to secure the belts 48 to the securing device 1. For that purpose, the belt retention unit 6 includes an outer bar 9 and an inner bar 10 that are oriented parallel to one another and are each disposed essentially parallel to the length 8 of the frame unit 3. The outer bar 9 and the inner bar 10 are disposed one after the other transversely to the length 8 and spaced apart from one another, so that between the outer bar 9 and the inner bar 10, a recess that is formed by a receiving region 11 for the belts 48 is provided. In one embodiment, in the length 8 of the frame unit 3, the outer bar 9 and the inner bar 10 are one piece with one another on end regions, using connecting elements 12 disposed in the end regions. One side support 13 of the frame unit 3 is disposed on each side of the belt retention unit 6 in the length 8 of the frame unit 3. The side supports 13 each have a length 14 that is oriented perpendicular to the length 8 of the frame unit 3. The side supports 13 also have a thicker cross section than a cross section of the outer bar 9 and of the inner bar 10 (See FIGS. 2, 4, and 6).

The side supports 13 extend from the belt retention unit 6 to the introduction unit 7, perpendicular to the length 8 of the frame unit 3 and merge with the introduction unit 7. Along the length 14 of the side supports 13, from the belt retention unit 6 in the direction of the introduction unit 7, a longitudinal support 15 of the frame unit 3 is disposed upstream of the introduction unit 7. The longitudinal support 15 extends parallel to the length 8 of the frame unit 3. The longitudinal support 15 has a rectangular cross section, and a lateral length of the longitudinal support 15, the lateral length being oriented parallel to the length 14 of the side supports 13, is shorter than a lateral length of the longitudinal support 15 that is oriented perpendicular to the length 14 of the side supports 13 and perpendicular to the length 8 of the frame unit 3. In the length 14 of the side supports 13, the introduction unit 7 is disposed directly downstream of the longitudinal support 15. The introduction unit 7 extends from the longitudinal support 15 in rib-like fashion away from the longitudinal support 15, in a direction parallel to the length 14 of the side supports 13. In a direction that is oriented perpendicular to the length 8 of the frame unit 3 and perpendicular to the length 14 of the side supports 13, the introduction unit 7 has a shorter transverse length than a transverse length of the longitudinal support 15 (see FIGS. 2, 4, and 6, in which the transverse length of the introduction unit 7 is adapted to a width of a groove of the table 2).

The introduction unit 7 extends in the longitudinal direction 8 of the frame unit 3 from the first side support 13 to the second side support 13. In a middle region 16, along the length 8 of the frame unit 3, the introduction unit 7 has an essentially rectangular recess. The essentially rectangular recess is formed by a receiving region 17 for the locking unit 5. In one embodiment, the locking unit 5 includes a locking element, configured as a clamping element 18, that is disposed rotatably inside the receiving region 17 about a rotary axis 19. The rotary axis 19 is oriented parallel to the length 14 of the side supports 13 and extends centrally through the longitudinal support 15. The rotary axis 19 extends through a center of the clamping element 18. The clamping element 18 is configured for locking the securing device 1 to a locking element 20, corresponding to the clamping element 18 of the locking unit 5, of the table 2. For this purpose, the clamping element 18 has an essentially block-shaped form (see FIGS. 1 to 8).

Figure 1:
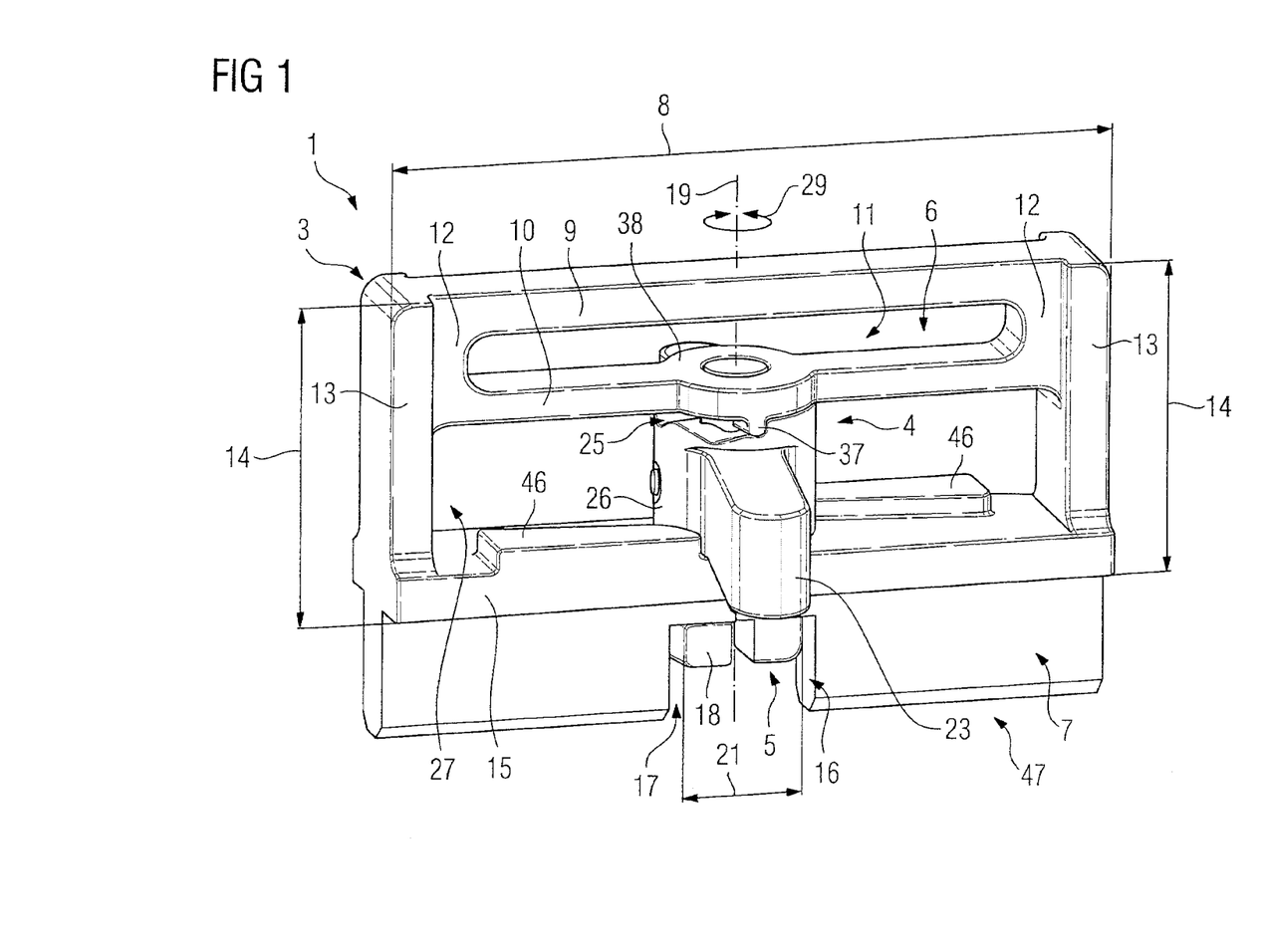
FIG. 1 shows a front view of one embodiment of a securing device in an open securing position.
Figure 2:
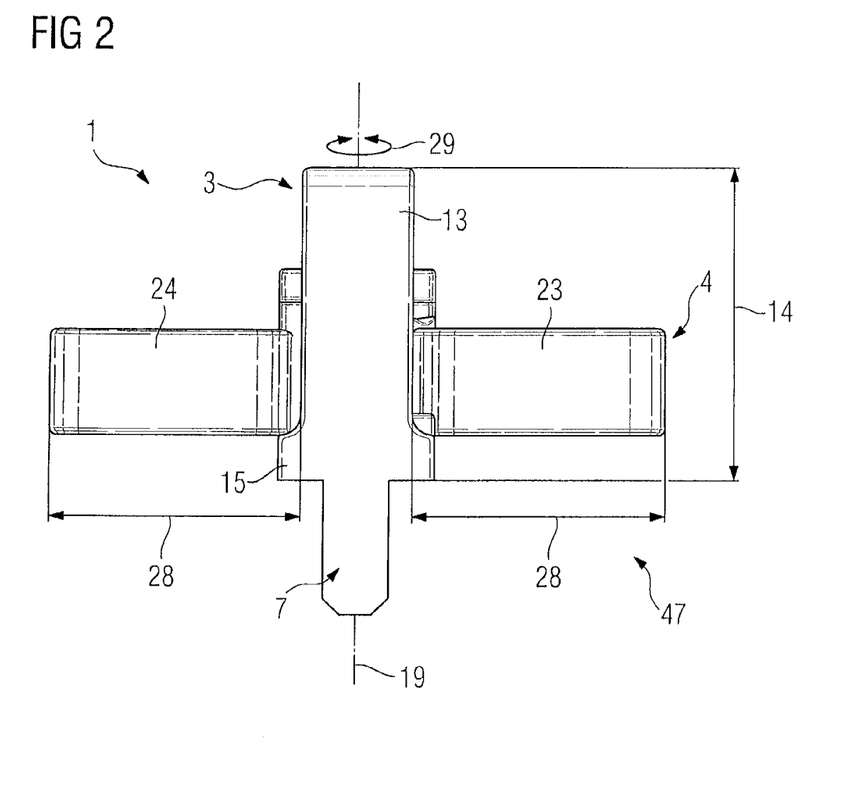
FIG. 2 shows a side view of one embodiment of the securing device of FIG. 1.

In an open securing position of the securing device 1, a length 21 of the clamping element 18 is oriented essentially parallel to the length 8 of the frame unit 3, so that the clamping element is disposed essentially entirely inside the receiving region 17 of the introduction unit 7 (see FIGS. 1 and 2). In a first locking position (see FIGS. 3 and 4), the clamping element 18 is in a position that is rotated relative to the open securing position of the clamping element 18. The clamping element 18 experiences a rotation by approximately 45°, so that the clamping element 18 protrudes out of the receiving region 17 of the introduction unit 7 on both sides. The length 21 of the clamping element 18 is oriented essentially perpendicular to the length 14 of the side supports 13, but offset from the length 8 of the frame unit 3 by the angle of rotation, by which the clamping element 18 was rotated. In a second locking position (see FIGS. 5 and 6), the clamping element 18 is also oriented perpendicular to the length 14 of the side supports 13 and also essentially perpendicular to the length 8 of the frame unit 3. The clamping element 18 experiences a further rotary motion. The clamping element 18 protrudes maximally out of the receiving region 17 of the introduction unit 7 on both sides. The maximum length of the clamping element 18 protruding out of the receiving region 17 is adapted to a width of the locking element 20 (e.g., a width of the groove) of the table 2, so that the securing device 1, in the second locking position, is clamped in captive and slip-proof fashion to the table 2.

For setting or adjusting one of the securing positions and/or locking positions, the adjusting unit 4 is provided. The securing device 1 has a force transmission element 22 for force transmission from the adjusting unit 4 to the locking unit 5. The force transmission element 22 is formed by a bolt, which in terms of a rotary motion about the rotary axis 19, is connected in form-locking fashion to the clamping element 18 of the locking unit 5 and in form-locking fashion to the adjusting unit 4. Upon a rotary motion of the adjusting unit 4, the rotary motion is transmitted to the clamping element 18 of the locking unit 5. The form-locking connection between the force transmission element 22, the adjusting unit 4 and the clamping element 18 is operative with regard to a motion parallel to the length 14 of the side supports 13. Alternatively, the force transmission element 22 may be decoupled from the adjusting unit 4 and/or the clamping element 18 in terms of a motion parallel to the length 14 of the side supports 13. The force transmission element 22 extends through the longitudinal support 15.

In one embodiment, the adjusting unit 4 has two adjusting elements 23, 24 that are each formed by one lever element configured as a rotary lever. The adjusting unit 4 has two guide units 25; in FIGS. 1 to 8, only one of the guide units 25 is visible. The adjusting elements 23, 24 and the guide units 25 are each disposed symmetrically with regard to the rotary axis 19 in the direction of rotation 29 around the rotary axis 19. The adjusting unit 4 has a cylindrical central region 26 that is supported between the longitudinal support 15 of the frame unit 3 and the inner bar 10. A spacing between a side of the inner bar 10 oriented toward the longitudinal support 15 and a side of the longitudinal support 15 oriented toward the inner bar 10 corresponds essentially to a height of the cylindrical central region 26 of the adjusting unit 4. In one embodiment, the spacing is slightly greater than the height of the cylindrical central region 26, so that a rotary motion of the adjusting unit 4 into or out of a securing position is made possible. Between the longitudinal support 15 of the frame unit 3 and the inner bar 10 of the belt retention unit 6, the frame unit 3 has an essentially block-shaped recess that forms a receiving region 27 for the adjusting unit 4. The two adjusting elements 23, 24 extend away from the central region 26 of the adjusting unit 4 on transversely opposed sides of the cylindrical central region 26 relative to the rotary axis 19. In one embodiment, the two adjusting elements 23, 24 are substantially symmetrical relative to the rotary axis 19. The length 21 of the clamping element 18 is oriented essentially perpendicular to a length 28 of the adjusting elements 23, 24.

Figure 7:
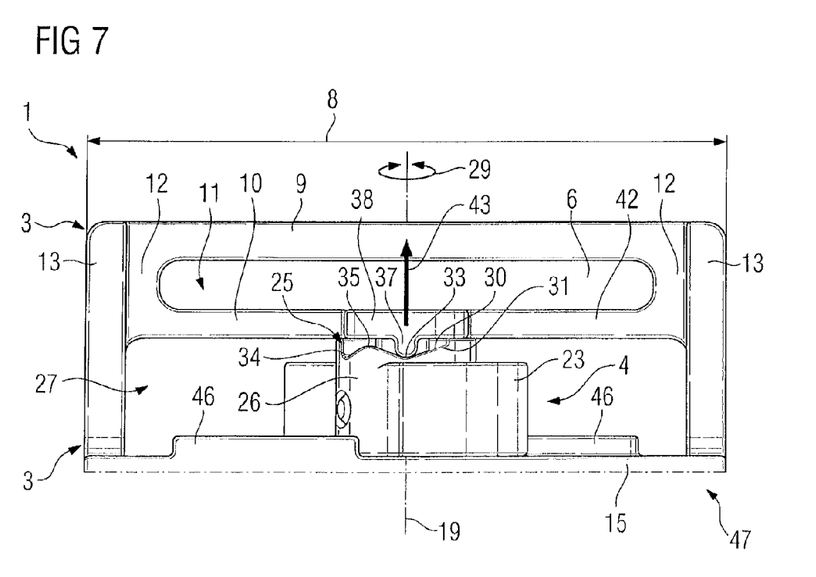
FIG. 7 shows a detail of one embodiment of the securing device having a spring element and an adjusting unit.
Figure 8:
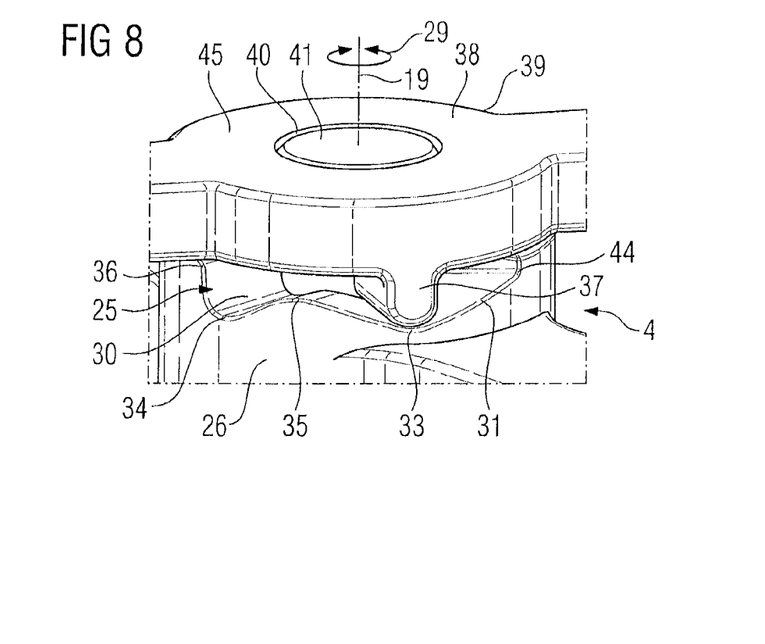
FIG. 8 shows a detail of one embodiment of a guide unit of the securing device.

The guide units 25 are disposed on an end region, facing the inner bar 10, of the cylindrical central region 26. The two guide units 25 are disposed symmetrically, relative to the rotary axis 19, in the direction of rotation 29 on the adjusting unit 4. In one embodiment, the two guide units 25 are essentially symmetrical to one another with regard to the rotary axis 19, and the two guide units 25 each include one guide path 30, as can be seen in FIGS. 7 and 8. The guide paths 30 extend around the rotary axis 19, each of the guide paths 30 along one undulating guide edge 31. A width of each of the wavy guide paths 30 extends from a surface of the cylindrical central region 26 of the adjusting unit 4 in a direction toward the rotary axis 19. Each of the guide paths 30 has two guide portions 33, 34 that each includes at least one local minimum along the guide path 30. The guide paths 30 extend such that in the guide portions 33, 34, the guide paths have the least spacing from a bearing face of the adjusting unit 4 for rotatably supporting the adjusting unit 4 on the longitudinal support 15. Between the guide portions 33, 34 having the local minimums, one guide portion 35 having a local maximum is disposed. In one embodiment, in a clockwise direction of rotation 29, the guide paths 30 are constantly descending as far as the guide portions 33 having the first local minimum. In the clockwise direction of rotation 29, the guide paths 30 each have one end region 36 that rises steadily from the guide portion 34 having the second local minimum.

Inside each of the guide units 25, one guide element 37 is guided. In one embodiment, the guide elements 37 are in rib-like form and in one piece with the inner bar 10 of the belt retention unit 6. The inner bar 10, in a middle region along the length of the inner bar 10, has a circular disk-like shaping 38 that extends in a direction perpendicular to the rotary axis 19. This shaping 38 has a transverse extent that is essentially equal to a diameter of the cylindrical central region 26 of the adjusting unit 4. The rib-like guide elements 37 extend from the circular disk-like shaping 38 parallel to the rotary axis 19, away from the shaping 38 in the direction of the introduction unit 7. The rib-like guide elements 37 are disposed in an outer peripheral region 39 of the circular disk-like shaping 38, and the two rib-like guide elements are disposed in opposed peripheral regions relative to the rotary axis 19. An imaginary line connecting the two rib-like guide elements 37 is oriented essentially perpendicular to the length of the inner bar 10. In the circular disk-like shaping 38, the inner bar 10 has a recess 40, in which a bearing cylinder 41 of the introduction unit 7 is disposed for rotatably supporting the introduction unit 7 (see FIG. 8).

Together with the circular disk-like shaping 38, the inner bar 10 has the function of a spring element 42. The inner bar 10 is deflectable counter to a spring force in a direction 43 toward the outer bar 9. In an undeflected state of the spring element 42, the spring element 42 is oriented essentially parallel to the length 8 of the frame unit 3.

The adjusting unit 4 is guided by the guide units 25, together with the guide element 37 and the spring elements 42, into the various securing positions during a locking motion. If the securing device 1 is in an open securing position, as is shown in FIGS. 1 and 2, the rib-like guide elements 37 are each disposed in an end region 44 pointing counterclockwise inside the guide units 25. The two lever elements of the adjusting unit 4 are oriented essentially perpendicular to the longitudinal axis 8 of the frame unit 3. The open securing position is formed by an introduction position of the securing device 1, for example, into the locking element 20 formed by a T-shaped groove of the table 2 (see FIG. 10).

The design of the introduction unit 7 prevents lateral tilting of the securing device 1 inside the T-shaped groove. Because of the design of the adjusting unit 4, upon introduction of the securing device 1 into the locking element of the table, a front side (see FIGS. 1, 3 and 5) or a back side of the securing device 1 may be oriented toward the patient, and in each case, a secure locking of the securing device 1 to the table 2 may be attained. In the end regions 44, a spacing of the guide edge from a bearing face 45 of the adjusting unit 4 for rotatably supporting of the adjusting unit 4 on the spring element 42 is minimal. As a result, a force in a direction from the adjusting unit 4 in the direction of the outer bar 9 acts on the rib-like guide elements 37 that are guided in the end regions 44. This causes a deflection of the spring element 42, together with the rib-like guide elements 37, counter to the spring force of the spring element 42.

Because of the spring force of the spring element 42, the rib-like guide elements 37 seek to execute a motion in the direction of the spring force. In addition, a guide portion in the end regions 44 has the steadily descending guide paths 30, so that together with the spring force acting on the guide elements 37, the result is a guided rotary motion of the adjusting elements 23, 24 counterclockwise relative to the guide elements 37. The guided rotary motion is reinforced until the first guide portions 33 having the first local minimums are reached, by the spring force and the shape of the guide paths 30 so that the guide elements 37 are guided essentially automatically into the first guide portions 33 when the adjusting elements 23, 24 are released in the open securing position. Once the guide portions 33 with the first local minimums are reached, the rotary motion of the adjusting unit 4 initially ends. The guide portions 33 having the first local minimums of the guide units 25 are designed such that the guide elements 37 are supported essentially without force in the guide portions 33, since a spacing of the guide paths 30 relative to a bearing face of the adjusting unit 4 for rotatably supporting the adjusting unit 4 on the spring element 42 in the first guide portions 33 corresponds essentially to a rib length of the guide elements 37.

Figure 3:
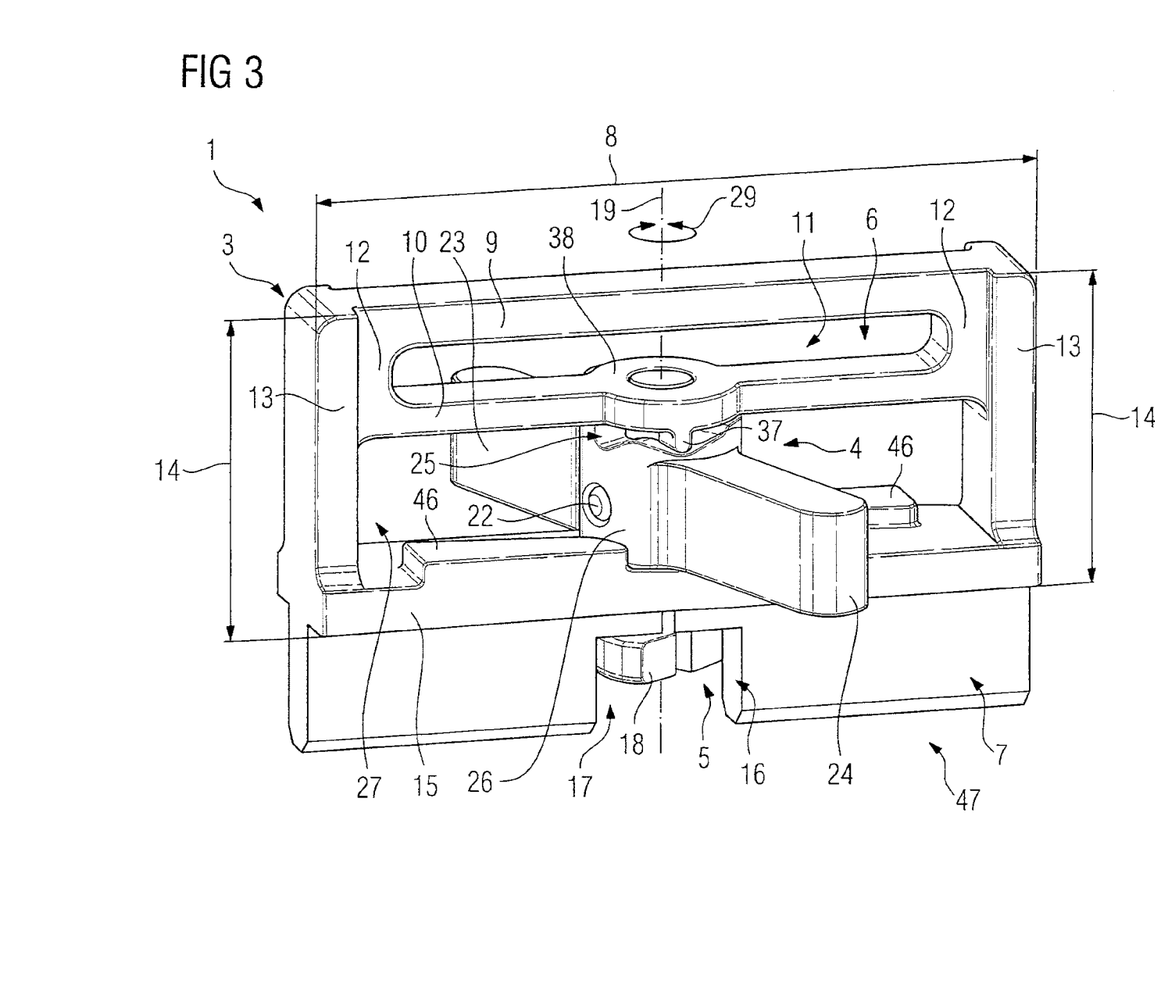
FIG. 3 shows a front view of one embodiment of the securing device of FIG. 1 in a first locking position.
Figure 4:
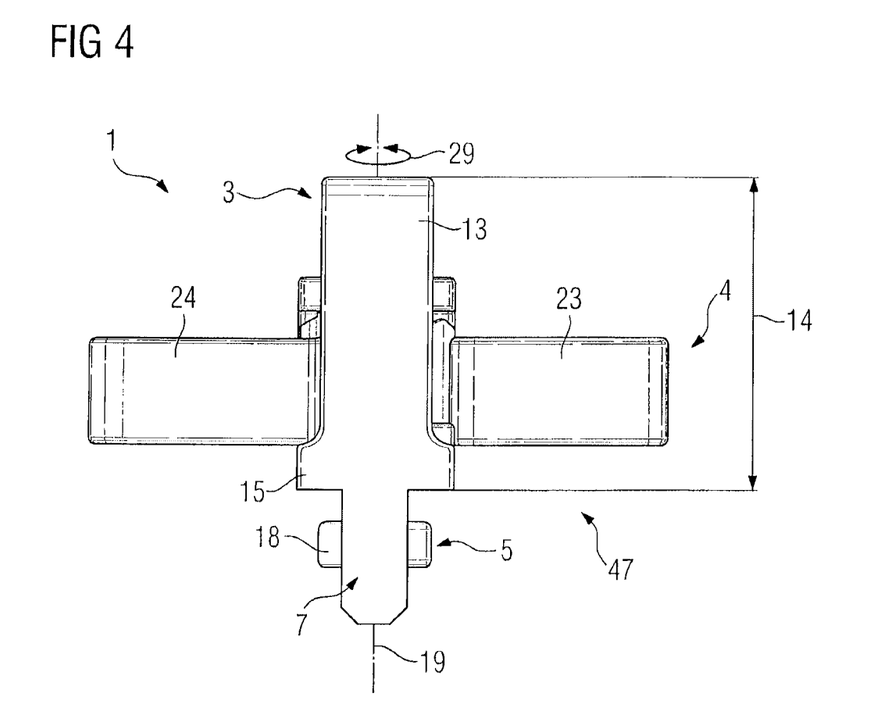
FIG. 4 shows a side view of one embodiment of the securing device of FIG. 2.
Figure 5:
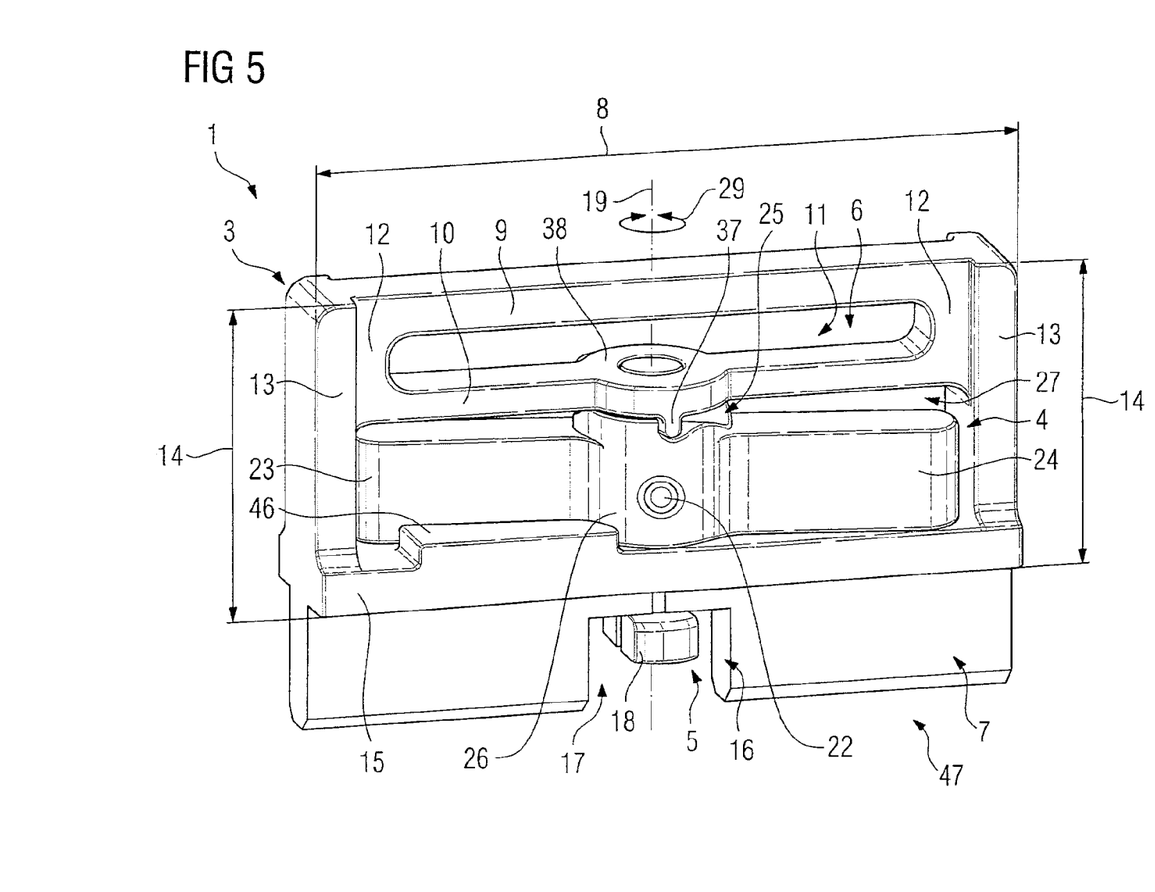
FIG. 5 shows a front view of one embodiment of the securing device in a second locking position.
Figure 6:
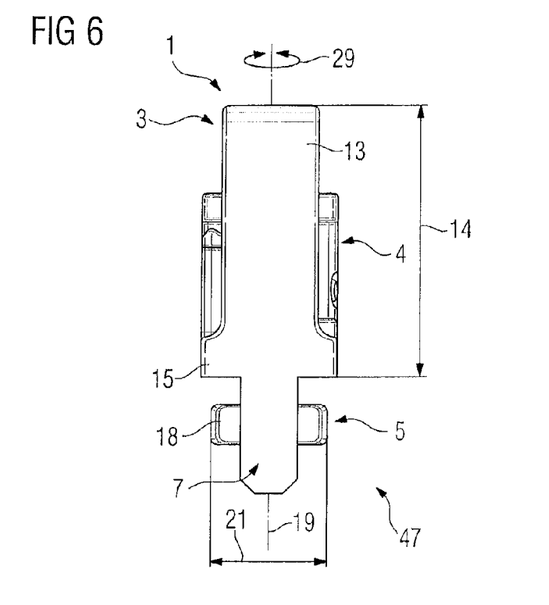
FIG. 6 shows a side view of one embodiment of the securing device of FIG. 5.

If the rib-like guide elements 37 are located in the guide portions 33, the adjusting unit 4 and the locking unit 5 are disposed in the first locking position (see FIGS. 3 and 4). The clamping element 18 of the locking unit 5 prevents the securing device 1 from falling out of the T-shaped groove in the table 2. The clamping element 18 also makes a motion of the securing device 1 along the T-shaped groove possible. The securing device 1 is disposed movably relative to the table 2 in a first direction in space 51 and is locked relative to the table 2 in a second and third direction in space 52, 53. In the first locking position, precise positioning and/or orientation (e.g., of the belt 43 and/or of the local coils) with respect to the table 2 may be done. In this first locking position, the adjusting elements 23, 24 are in a position rotated by approximately 45° relative to the length 8 of the frame unit 3. Because of the curved course of the guide paths 30, the first locking position is a stable position that may be changed only by an exertion of force from outside.

After a positioning of the securing device 1 relative to the table 2, the adjusting unit 4 is rotated onward counterclockwise by the user. By further counterclockwise rotation of the two adjusting elements 23, 24, the guide elements 37 are guided farther along the guide paths 30. A force is first exerted in order to move the guide elements 37 out of the first local minimum counter to the spring force of the spring element 42. The guide elements 37 are deflected along with the spring element 42 counter to the spring force such that the guide elements 37 may move past the guide portion 35 having the local maximum. Terminating the rotary motion before the maximum is reached and/or exceeded, leads, because of the spring force of the spring element 42 along with the steadily descending guide paths 30 toward the guide portion 33, to a clockwise rotary motion of the adjusting unit 4 until the guide elements 37 are again in the stable position inside the first local minimum.

Once the guide elements 37 have overcome the guide portions 35 having the local maximums, a locking motion of the adjusting unit 4 into the second locking position (see FIGS. 5 and 6) is reinforced by the spring force and the steadily descending guide paths 30, so that the guide elements 37 at least partly snap into the second locking position. The second locking position is assumed when the guide elements 37 are located in the guide portions 34 having the second local minimums. In one embodiment, the guide portions 34 having the second local minimums of the guide units 25 are configured such that the guide elements 37 are supported essentially without force in the guide portions 34, since a spacing of the guide paths 30 relative to the bearing face 45 of the adjusting unit 4 for rotatably supporting of the adjusting unit 4 on the spring element 42 in the guide portions 34 corresponds essentially to a rib length of the guide elements 37. Independent release of the securing device 1 out of the second locking position is thus prevented. In this position, the clamping element 18 is clamped with the T-shaped groove of the table 2 and thus secures the securing device 1 against slipping relative to the table 2. Because of the essentially perpendicular orientation of the length 28 of the adjusting elements 23, 24 to the length 21 of the clamping element 18, the adjusting elements 23, 24 are oriented essentially parallel to the length 8 of the frame unit 3, so that the adjusting elements 23, 24 are disposed essentially entirely inside the receiving region 27 for receiving the adjusting unit 4. This prevents unwanted annoyance of the patient, for example, from protruding adjusting elements. This also prevents the securing device 1 from being released out of the second locking position.

To prevent the adjusting elements 23, 24 from over rotating out of the second locking position, the frame unit 3 has two stop elements 46. In one embodiment, the two stop elements 46 are one piece with the frame unit 3 and with the longitudinal support 15 of the frame unit 3. The two adjusting elements 23, 24, in the second locking position, rest on the two stop elements 46, and the two stop elements 45 have a length that is essentially parallel to the length 8 of the frame unit 3. The two stop elements 46 extend in the length of the longitudinal support 15, from a peripheral region to just before a space occupied by the central region 26 of the adjusting unit 4. In one embodiment, the two stop elements 46 are tapered in the direction of the cylindrical central region 26 in the length of the longitudinal support 15. The two stop elements 46 are each disposed on a counterclockwise-pointing peripheral region on the longitudinal support 15, so that a counterclockwise-pointing face of the adjusting elements 23, 24 rests on the respective stop element 46 in the second locking position. Besides preventing overrotation in the second locking position, the two stop elements 46 each have a further stop function in the open securing position (e.g., see FIGS. 1 and 2). The clockwise-pointing face of the adjusting elements 23, 24 rests on the respective stop element 46. Using the two stop elements 46, over rotation of the adjusting unit 4 out of a securing position is prevented, and thus an unwanted overtensing of the spring element 42 is avoided.

The securing device 1 of the present embodiments, because of the design, makes one-handed use by a user (e.g., a medical staff member) possible. Locking of the securing device 1 is provided in each of the introduction positions.

As an alternative to the exemplary embodiments described above, an embodiment of the securing device 1 that has only one adjusting element and/or stop element may be provided. The securing device 1 may have a plurality of guide elements and/or guide units that differ from the securing device 1 described above.

The frame unit may have at least one guide unit, and the adjusting unit may have at least one guide element. The spring element may have an alternative embodiment and/or disposition inside the securing device (e.g., the spring element is disposed between the longitudinal support and the adjusting unit and is formed, for example, by a helical spring).

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A securing device for securing medical accessory units to a table for a medical imaging apparatus, the securing device comprising:
    a frame unit comprising an inner bar and an outer bar;
    a locking unit rotatably mounted to the frame unit and configured for locking the securing device to the table; and
    an adjusting unit configured for setting at least one locking position of the locking unit,
    wherein the adjusting unit comprises a guide unit configured for a guided locking motion of the locking unit into the at least one locking position,
    wherein the inner bar is a spring element that reinforces the guided locking motion of the locking unit into the at least one locking position by deflecting counter to a spring force in a direction toward the outer bar as a guide element extending from the spring element is guided along the guide unit.

2. The securing device as defined by claim 1, wherein the guide element extends away from the spring element.

3. The securing device as defined by claim 2, wherein the guide unit comprises a guide path with a guide portion, the guide portion including a local minimum along the guide path.

4. The securing device as defined by claim 1, wherein the guide unit comprises a guide path with a guide portion, the guide portion including a local minimum along the guide path.

5. The securing device as defined by claim 4, wherein the guide element guided in the guide portion brings about the at least one locking position of the locking unit.

6. The securing device as defined by claim 4, wherein the guide unit comprises at least two guide portions, each guide portion of the at least two guide portions having one local minimum along the guide path for at least two different locking positions, the at least two different locking positions comprising the at least one locking position.

7. The securing device as defined by claim 1, wherein the locking unit is provided in the at least one locking position for a motion along at least a first direction in space and for a locking along at least a second direction in space.

8. The securing device as defined by claim 1, wherein the adjusting unit further comprises an adjusting element that is formed by a lever element.

9. The securing device as defined by claim 8, wherein the frame unit comprises a recess, and wherein the adjusting element of the adjusting unit is disposed substantially entirely inside the recess in the at least one locking position.

10. The securing device as defined by claim 1, wherein the adjusting unit further comprises at least two adjusting elements that are disposed essentially symmetrically relative to a rotary axis.

11. The securing device as defined by claim 1, wherein the frame unit comprises a stop element.

12. The securing device as defined by claim 1, further comprising a force transmission element configured for transmitting force from the adjusting unit to the locking unit.

13. The securing device as defined by claim 1, wherein the frame unit comprises an introduction unit configured for introduction into a locking element corresponding to the locking unit of the table, and wherein the locking unit is disposed at least partly in a region of the introduction unit.

14. The securing device as defined by claim 13, wherein the introduction unit comprises a recess, and wherein the locking unit is disposed at least partly inside the recess.

15. The securing device as defined by claim 1, wherein the locking unit comprises a clamping element.

16. The securing device as defined by claim 15, wherein the clamping element has a length that is oriented substantially perpendicular to a length of an adjusting element of the adjusting unit.

17. The securing device as defined by claim 1, wherein the adjusting unit further comprises an adjusting element that is formed by a lever element.

* * * * *